Sept. 20, 1960
J. J. PROHASKA
2,953,461
MEAT TREATING APPARATUS AND METHOD
Filed May 21, 1957
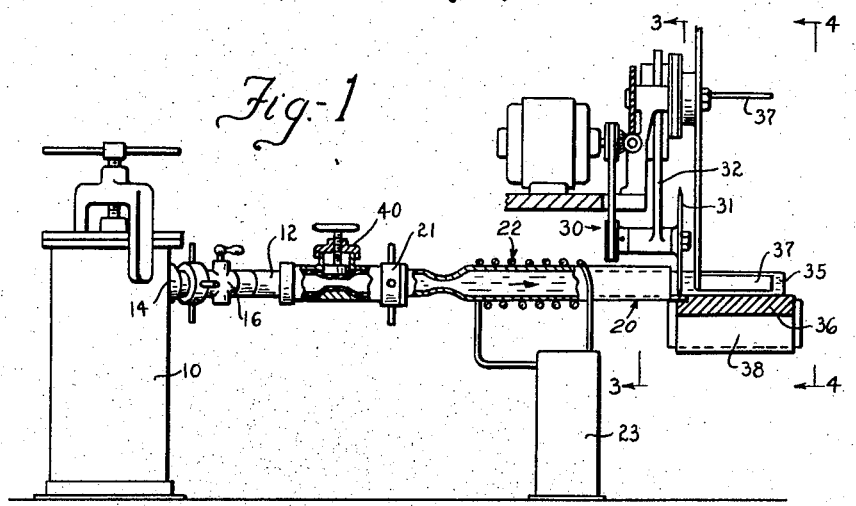
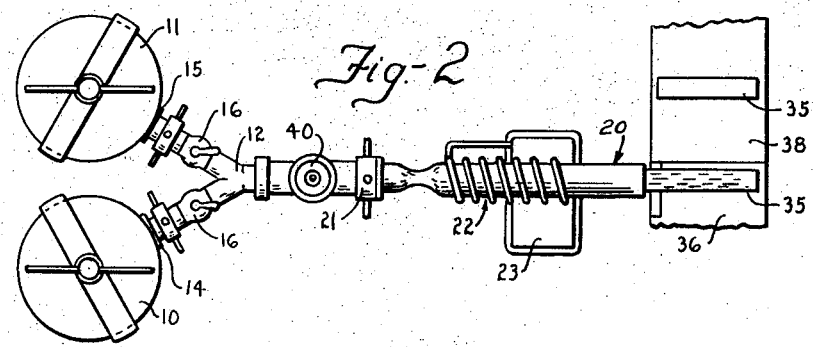
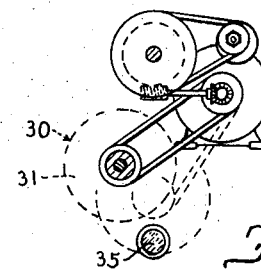
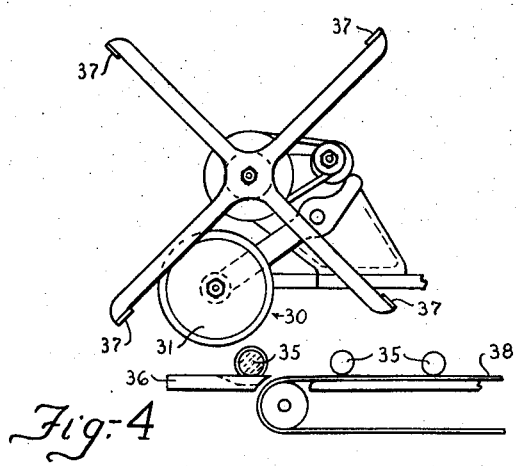
INVENTOR.
JAMES J. PROHASKA
BY
ATTORNEY

United States Patent Office 2,953,461
Patented Sept. 20, 1960

2,953,461
MEAT TREATING APPARATUS AND METHOD

James J. Prohaska, 318 S. Edgewood Ave., La Grange, Ill.

Filed May 21, 1957, Ser. No. 660,619

12 Claims. (Cl. 99—109)

This invention relates to meat-treating apparatus and method and more particularly to a method of comminuted meat processing and means to effect a partial cooking thereof.

It has been proposed in the past to temporarily enclose a comminuted meat mixture in a mold while subjecting the mixture to a cooking temperature and thereafter strip the mold from the product. In certain instances where the cooking is performed with a high frequency electrical current, the product is simultaneously and uniformly heated throughout its mass. It has been found that in so treating a sausage mixture, for example, that the individual link product can be molded and made to take an initial set which is produced within the meat to make it self-sustaining, such that the product can be stripped from the mold and subjected to further processing to complete it. Such a process is now being used commercially in the production of frankfurters, etc., and in following this practice the final cooking and smoking operations are performed upon a partially cooked product after it has been so treated to shape the meat mixture to have the link form of the hot dog or frankfurter. The product after being stripped from the individual molds used to effect the formation of each separate link is then further cooked and smoked.

The present invention provides an improvement on such prior art developments by disclosing a method and apparatus in which the comminuted mixture may be processed by being continuously extruded from a conventional stuffer mechanism and precooked while moving through an extension of the stuffing horn to a degree to produce at least an initial set therein while at the same time improving the exterior appearance of the ultimate product. In its broadest aspects, the invention contemplates the steps of continuously delivering the comminuted mixture through a forming horn while simultaneously subjecting the mixture to a high frequency current to produce at least an initial set in the meat mixture. The forming horn is preferably made to have a smooth interior surface whereby the surface portion of the mass passing through the horn is positively smoothed as the partial cooking step is performed upon the mixture while it is being driven forwardly inside the tube. By completing at least the initial set under such conditions, a better final appearance on the surface of the ultimate product results and the system eliminates the necessity of providing individual molds for each sausage link as has been the practice in the past.

When the mixture formed in accordance with this teaching passes from the exit end of the forming horn, it is severed into equal length links which may be disposed upon a conveyor to be carried through any further processing needed, such as in the case of frankfurters, through the smoking and cooking ovens.

The preferred form of the invention is shown in the drawings wherein:

Figure 1 is a diagrammatic side view of the structure forming this invention;

Figure 2 is a plan view of the assembly shown in Figure 1 with the severing and pusher conveyor not shown;

Figure 3 is a detailed view showing a cut-off knife such as may be disposed at the outlet end of the forming horn; and Figure 4 is a detailed view of a wiper means which may be driven in timed relation to the cut-off operation to move the severed product from the end of the forming horn onto a suitable conveyor to be carried to any further processing required.

As is conventional in the meat industry, a pair of pressurized stuffers 10 and 11 may be connected to a suitable main conduit means 12 through individual outlet passages 14 and 15, respectively. Each of these outlet passages includes a cut-off valve 16 and by alternately connecting first one and then the other of the stuffers to the passage 12, this arrangement provides a system whereby a plurality of batches of comminuted meat mixture may be forced into conduit 12 to fill it and to provide a continuous flow therethrough. As one of the stuffers is feeding mixture into the conduit 12, the other stuffer is being loaded and pressurized. When the first stuffer 11, for example, is exhausted the valve 16 associated therewith is closed while the valve 16 associated with the freshly loaded stuffer 10 is simultaneously opened, and by alternating the connection of stuffers 10 and 11 with conduit 12 it may be maintained full such that a continuous, uninterrupted flow may be produced.

The conduit 12 is connected to a forming horn 20 which is adapted to convey and shape the meat mixture as it is forced therethrough. The forming horn is preferably constructed to have a passage for the meat of approximately the same cross-sectional area or slightly smaller area than passage 12, the passage of the horn being of uniform cross-section, however, with the exception of the conventional restriction at the inlet end thereof and the inside walls of the passage against which the product rubs during its passage therethrough, being relatively smooth. The forming horn 20 may be detachably connected to the conduit 12 by means of a suitable threaded connection and nut 21 so that, in effect, the forming horn 20 preferably provides merely a continuation of passage 12.

The forming horn 20 is, in accordance with the teaching of this invention, formed of a material that is relatively nonconducting electrically and it is suggested that glass or a suitable plastic material, such as Teflon, may be used for this purpose. The forming horn 20 is adapted to be surrounded by a suitable coil 22 that is connected to a high frequency generator 23 whereby to establish a field of high frequency current within the confines of the coil. The meat mixture which is filled into the passage and being passed through the forming horn 20 may then be subjected to the action of a high frequency heating current when the generator is energized, to at least partially cook the meat in the mixture and produce an initial set in the product. Other partial cooking might also be used such as electrical resistance heating where the meat forms an element of an electrical circuit. Any other conventional cooking method could be used, but in any event, the forming horn 20 must be designed to be of a length consistent with the quantity of mixture being forced through the horn such that the mixture may be heated to a temperature of approximately 140° F. for a sufficient length of time to produce the necessary preliminary cooking and initial setting of the comminuted meat product. To insure a proper cooking operation, the forming horn should provide a restricted flow passage to control the speed of the flow therethrough. In this connection it is apparent that the cross-sectional shape of the horn may take any desired form such as round, square, oblong, oval, somewhat crescent-shaped or the like.

As the partially treated mixture which has the initial set produced therein issues from the horn 20 in the form of a continuous stick, the knife 30 is operative to effect a cutting off of a link-sized length of the mixture. The knife 30 preferably includes a rotating knife blade 31 mounted on an arm 32 which may be oscillated in timed relation to the movement of the product, into and out of the path of the meat issuing from the forming horn whereby to successively slice off the individual links, all of which will be substantially identical in shape, texture, and appearance.

As the individual links 35 are severed from the end of the stick of partially cooked mixture they are disposed in their self-sustained condition on a table 36 momentarily until a wiper blade 37 is driven into contact therewith to push them sucessively onto a conveyor 38. The conveyor 38 is adapted to carry the individual links 35 disposed thereon to any further processing as may be required, such as smoking or additional cooking, depending upon the type of product being handled.

In the preferred form of the invention, the inside surface of forming horn 20 is not only polished for the purpose of smoothing the surface of the product being forced therethrough, but a diaphragm valve 40 is provided at the entrance to the forming horn. The diaphragm valve is adapted to be closed in against the surface of the product filling the passage and flowing through conduit 12 in order to dispose the surface fibers of the comminuted meat in a relatively parallel relationship. This rubbing action of the diaphragm valve which produces somewhat of a combing effect, causes the surface fibers to be laid all in the same direction such that an improved surface appearance results in the ultimate finished product. This combing effect produced by the rubbing action of the diaphragm valve is continued as the treated meat mixture issues through the filled forming horn 20, however, as soon as the cooking action starts and the fibers begin to take on an initial set, it is thereafter impractical to attempt to control the position of these fibers.

The cooking action proceeds within the forming horn at a temperature sufficiently high to accomplish the desired cooking and at a sufficiently low temperature such that the fat particles are not unduly effected and at such a temperature that water pockets do not form. Preferably this preliminary cooking of the meat product flowing through the horn is accomplished at about 140° F. by heating the mixture simultaneously throughout its mass. Once an initial set has been produced in the product, it may thereafter be removed from the forming horn or continued therethrough to complete any greater degree of cocking desired, or possibly other processing.

It is apparent that, while the above description covers a preferred form of accomplishing this invention, modifications thereof may occur to those skilled in the art which will fall within the scope of the following claims.

I claim:

1. The method of treating a comminuted meat product comprising flowing the comminuted meat through a smooth elongated passage in intimate contact with the wall thereof, and subjecting the flowing product to a heating cycle, the heat produced in said cycle being distributed simultaneously and uniformly throughout the product, continuing the heating cycle for such a length of time as to partially cook the product uniformly throughout whereby to convert the product to a self sustaining mass while it is moving over the smooth surface of the passage.

2. A method of treating a comminuted meat product comprising combing the surface fibers to lay them substantially all in one direction and then issuing the comminuted product into and forcing the product through a completely filled elongated passageway, and subjecting the product to a heating cycle, the heat produced in said cycle being distributed simultaneously and uniformly throughout the product, continuing the heating cycle for such a length of time as to partially cook the product uniformly throughout whereby to convert the product to a self sustaining mass having a smooth outer surface.

3. The method of processing a comminuted meat product comprising combing the surface fibers to cause them to lay substantially all in one direction, confining the combed product in a passage having a smooth interior surface, simultaneously rubbing the surface of the product in the direction of the combed fibers, and subjecting the product to a heating cycle, the heat produced in said cycle being distributed simultaneously and uniformly throughout the product, continuing the heating cycle for such a length of time as to partially cook the product uniformly throughout whereby to convert the product to a self sustaining mass having a smooth outer surface.

4. The method of processing a comminuted meat product comprising combing the surface fibers to cause them to lay substantially all in one direction, confining the combed product in a passage having a smooth interior surface, simultaneously rubbing the surface of the product in the direction of the combed fibers, and subjecting the product to a heating cycle, the heat produced in said cycle being distributed simultaneously and uniformly throughout the product, continuing the heating cycle for such a length of time as to raise the temperature of the product to approximately 140° F. and partially cook the product uniformly throughout whereby to convert the product to a self sustaining mass having a smooth outer surface.

5. In a comminuted meat processing machine wherein the meat is delivered from a meat stuffer to a high frequency heating means, the improvement comprising a tube formed of an electrical non-conductor having an inlet and outlet, said tube having a smooth interior surface, means for filling and continuously feeding a comminuted meat product into said tube, means surrounding said tube to establish a high frequency field within the confines of the tube, and said surrounding means extending lengthwise along said tube a distance whereby to produce the required degree of heating for a sufficient length of time to produce at least a partial cooking and an initial set in the comminuted meat product as it passes from the inlet to the outlet.

6. In a comminuted meat processing machine wherein the meat is delivered from a meat stuffer to a high frequency heating means, the improvement comprising a tube formed of an electrical non-conductor having an inlet and outlet, said tube having a smooth interior surface, a diaphragm valve at the inlet of said tube, means for filling and continuously feeding a comminuted meat product into said tube, means surrounding said tube to establish a high frequency field within the confines of the tube, and said surrounding means extending lengthwise along said tube a distance whereby to produce the required degree of heating for a sufficient length of time to produce at least a partial cooking and an initial set in the comminuted meat product as it passes from the inlet to the outlet.

7. In a comminuted meat processing machine wherein the meat is delivered from a meat stuffer to a high frequency heating means, the improvement comprising a tube formed of an electrical non-conductor having an inlet and outlet, said tube having a smooth interior surface, a diaphragm valve at the inlet of said tube, means for filling and continuously feeding a comminuted meat product into said tube, means surrounding said tube to establish a high frequency field within the confines of the tube, and said surrounding means extending lengthwise along said tube a distance whereby to produce the required degree of heating for a sufficient length of time to produce at least a partial cooking and an initial set in the comminuted meat product as it passes from the inlet to the outlet, means to sever the initially set product as it issues from the outlet, said severing means being operative to separate the partially cooked product into substantially uniform pieces.

8. In a comminuted meat processing machine wherein the meat is delivered from a meat stuffer to a high frequency heating means, the improvement comprising a tube formed of an electrical non-conductor having an inlet and outlet, said tube having a smooth interior surface, a diaphragm valve at the inlet of said tube, means for filling and continuously feeding a comminuted meat product into said tube, means surrounding said tube to establish a high frequency field within the confines of the tube, said surrounding means extending lengthwise along said tube a distance whereby to produce the required degree of heating for a sufficient length of time to produce at least a partial cooking and an initial set in the comminuted meat product as it passes from the inlet to the outlet, means to sever the initially set product as it issues from the outlet, said severing means being operative to separate the partially cooked product into substantially uniform pieces, and means timed with said severing means to receive said pieces serially for conveyance to further processing steps.

9. A continuously operative comminuted meat processing machine having feeding means adapted to be connected into a conduit having an inlet and outlet, comprising a diaphragm valve at the inlet end of said conduit, an elongated tube forming a part of said conduit between the valve and the outlet from the conduit, a high frequency heating means including a high frequency generator to produce a substantially uniform field throughout the confines of the tube, said tube being formed of an electrical non-conductor and having a relatively smooth interior surface, said tube and said heating means extending lengthwise of the conduit a distance sufficient to enable said heating means to partially cook and produce an initial set in a meat product fed through the tube, cutting means at the outlet to sever the set meat into predetermined lengths, and means to receive the severed lengths for delivery away from the machine.

10. A continuously operative comminuted meat processing machine having feeding means adapted to be connected into a conduit having an inlet and outlet, comprising a diaphragm valve at the inlet end of said conduit, an elongated tube forming a part of said conduit between the valve and the outlet from the conduit, a high frequency heating means including a high frequency generator to produce a substantially uniform field throughout the confines of the tube, said tube being formed of an electrical non-conductor and having a relatively smooth interior surface, said tube and said heating means extending lengthwise of the conduit a distance sufficient to enable said heating means to develop a temperature of about 140° for a sufficient time to partially cook and produce an initial set in a meat product fed through the tube, cutting means at the outlet to sever the set meat into predetermined lengths, and means to receive the severed lengths for delivery away from the machine.

11. A continuously operative comminuted meat processing machine having feeding means adapted to be connected into a conduit having an inlet and outlet, comprising a diaphragm valve at the inlet end of said conduit, an elongated tube forming a part of said conduit between the valve and the outlet from the conduit, a high frequency heating means including a high frequency generator to produce a substantially uniform field throughout the confines of the tube, said tube being formed of an electrical non-conductor and having a relatively smooth interior surface, said tube and said heating means extending lengthwise of the conduit a distance sufficient to enable said heating means to partially cook and produce an initial set in a meat product fed through the tube, intermittently operative cutting means at the outlet operative to sever the set meat into predetermined lengths, and means to receive the severed lengths for delivery away from the machine.

12. A continuously operative comminuted meat processing machine having feeding means adapted to be connected into a conduit having an inlet and outlet, comprising a diaphragm valve at the inlet end of said conduit, an elongated tube forming a part of said conduit between the valve and the outlet from the conduit, a high frequency heating means including a high frequency generator to produce a substantially uniform field throughout the confines of the tube, said tube being formed of an electrical non-conductor and having a relatively smooth interior surface, said tube and said heating means extending lengthwise of the conduit a distance sufficient to enable said heating means to partially cook and produce an initial set in a meat product fed through the tube, intermittently operative cutting means at the outlet operative to sever the set meat into predetermined lengths, means to receive the severed lengths, and wiper means timed to the knife action to deliver the separate lengths from the receiving means, and a conveyor positioned to have the lengths delivered thereto for carrying the partially cooked product to means adapted to complete the treatment thereof.

References Cited in the file of this patent

UNITED STATES PATENTS

| | | |
|---|---|---|
| 1,868,990 | Peele | July 26, 1932 |
| 2,182,211 | Paddock | Dec. 5, 1939 |
| 2,572,833 | Balzarini | Oct. 30, 1951 |
| 2,623,451 | Prohaska | Dec. 30, 1952 |
| 2,685,518 | Prohaska | Aug. 3, 1954 |
| 2,774,991 | McCurdy | Dec. 25, 1956 |